United States Patent [19]

Fealey

[11] Patent Number: 5,091,123
[45] Date of Patent: Feb. 25, 1992

[54] METHOD OF ADJUSTING AN ADJUSTABLE PISTON-DRIVER CONNECTION

[75] Inventor: William S. Fealey, Jamestown, R.I.

[73] Assignee: Stanley-Bostitch, Inc., East Greenwich, R.I.

[21] Appl. No.: 597,325

[22] Filed: Oct. 15, 1990

Related U.S. Application Data

[62] Division of Ser. No. 321,756, Mar. 10, 1989, Pat. No. 5,000,365.

[51] Int. Cl.[5] .................... A29C 73/00; A29C 67/00
[52] U.S. Cl. .................................. 264/36; 156/152; 264/262
[58] Field of Search .................. 156/152, 344; 264/36, 264/262

[56] References Cited

U.S. PATENT DOCUMENTS

| | | | |
|---|---|---|---|
| 4,040,164 | 8/1977 | Briles | 227/130 |
| 4,122,904 | 10/1978 | Haytayan | 173/127 |
| 4,248,232 | 2/1981 | Engelbrecht et al. | 264/36 |
| 4,461,663 | 7/1984 | Tachibana et al. | 156/344 |
| 4,719,686 | 1/1988 | Fagin et al. | 29/402.08 |
| 4,766,663 | 8/1988 | Milam | 264/262 |

Primary Examiner—Jan H. Silbaugh
Assistant Examiner—Brian J. Eastley
Attorney, Agent, or Firm—Cushman, Darby & Cushman

[57] ABSTRACT

A piston and a fastener driving element connection including interengaging threads on the piston and fastener driving element and a thermoplastic locking compound between the interengaging threads. The connection being adjustable by following a method including the steps of heating the threaded connection sufficient to soften the thermoplastic locking compound, effecting a relative turning movement between the fastener driving element and piston while the thermoplastic locking compound is softened to an extent sufficient to bring the fastener driving element and piston into the desired position of adjustment, and then allowing the softened thermoplastic locking compound to harden.

2 Claims, 3 Drawing Sheets

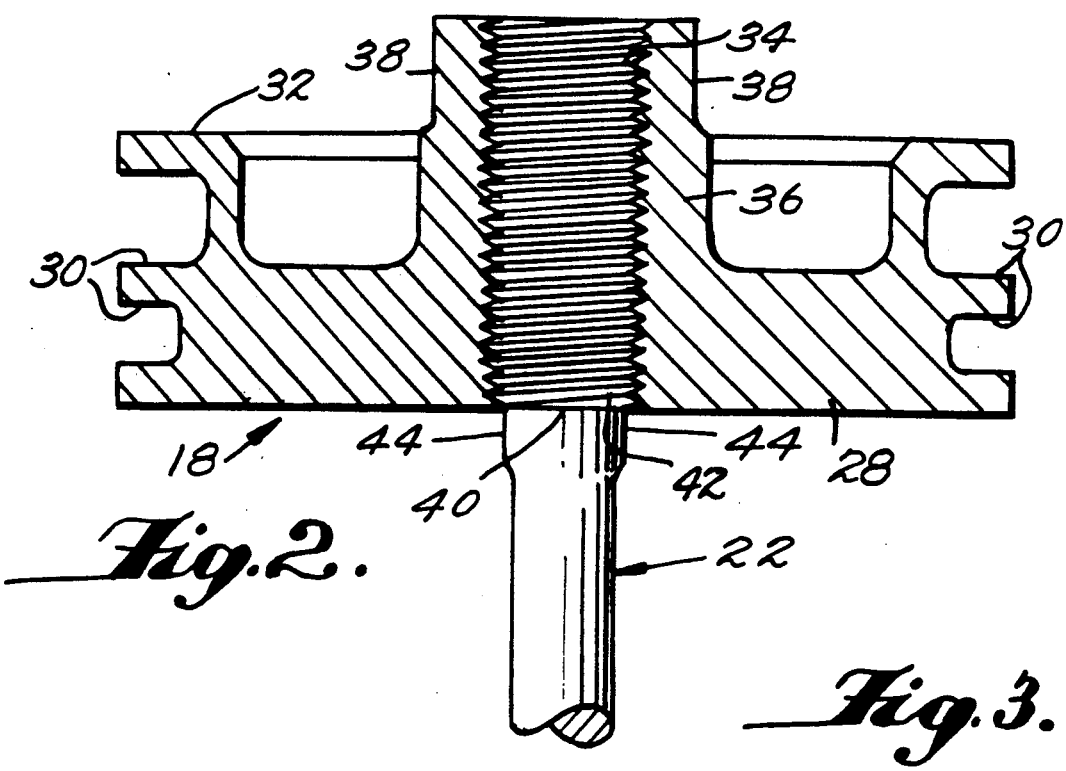
Fig. 2.
Fig. 3.
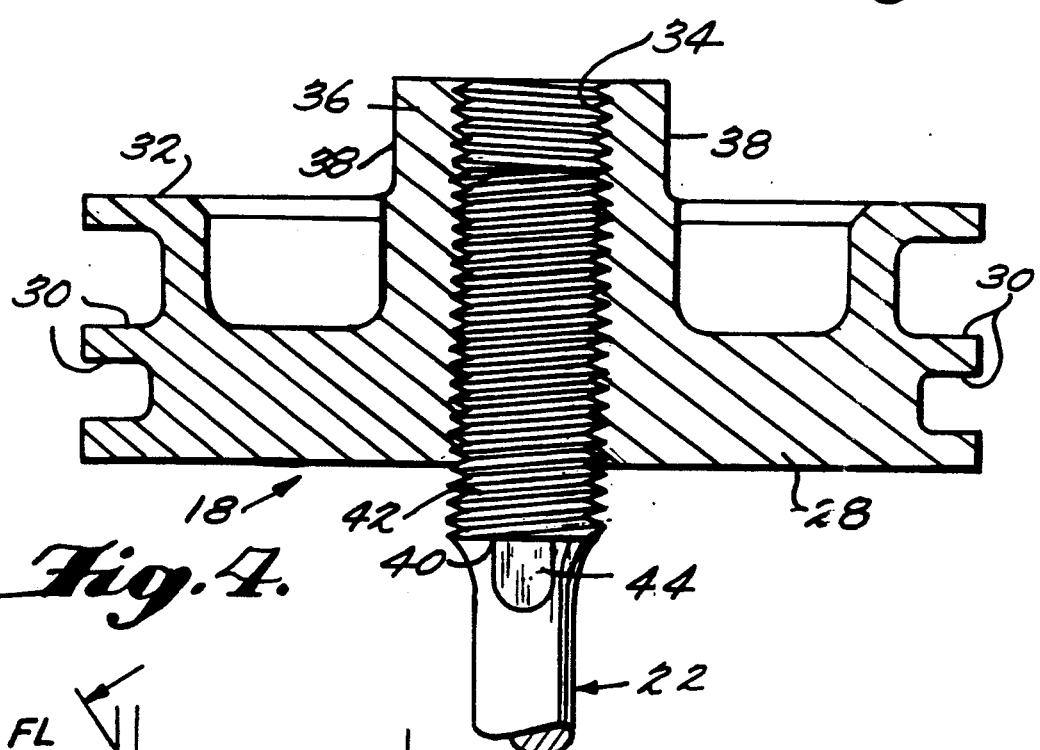
Fig. 4.
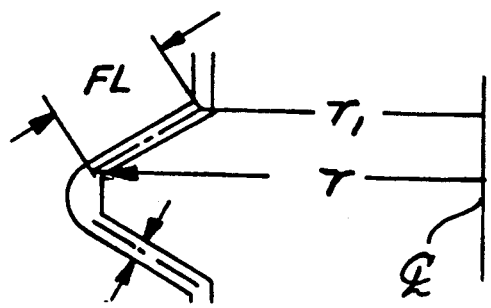

METHOD OF ADJUSTING AN ADJUSTABLE PISTON-DRIVER CONNECTION

This is a division of application Ser. No. 07/321,756, filed Mar. 10, 1989, now U.S. Pat. No. 5,000,365.

This invention relates to fastener driving devices and, more particularly, to the piston and fastener driving element assembly of such devices.

The type of fastener driving device herein contemplated typically includes a fastener driving element or driver which is mounted within a drive track within which successive fasteners are fed. The driver is moved through repetitive cycles, each of which includes a drive stroke during which the fastener is moved out of the drive track into the workpiece and a return stroke. The fastener driving element is fixedly connected with a piston which is mounted within a cylinder for movement through a drive stroke and return stroke with the fastener driving element. The piston is driven by gases under pressure preferably in the form of compressed air, applied to an operative surface area of the piston. While the invention is particularly suited to compressed air units, there can be applicability to internal combustion and ballistic actuated units where relatively low operating temperatures are contemplated.

The driver-piston assembly of a device of this type is inherently subjected to high stress forces tending to produce wear on the driver and disassembly of the driver from the piston. Due to the latter tendency, the usual connection between the fastener driving element and the piston constitutes an interengaging thread connection. This connection may take several forms. One form is to provide a central through bore in the piston which is formed with internal threads and to provide on the fastener driving element a cylindrical end portion the inner end of which terminates in a radially extending annular flange. The cylindrical end portion of the fastener driving element is provided with exterior threads which mesh with the interior threads of the piston. The usual arrangement is to effect a threaded interengagement of the two parts with the use of a locking compound, such as Loctite, with the annular flange of the fastener driving element being torqued into engagement with the piston at the portion thereof below the lower end of the bore. In arrangements of this type, the piston and fastener driving elements are formed with flat surfaces so that in the final assembly appropriate tools can be used to apply an appropriate torque to the assembly. The torquing of the intermeshing relationship between the threads which creates substantial opposing axial forces in the intermeshing threads adds to the efficacy of the joint enabling the length of meshing interengagement to be minimized. On the other hand, the need to provide the flange which permits a high torque to be applied, materially increases the cost of the fastener driving element.

While torqued assemblies with flanged drivers are most prevalent, there are units which are neither flanged nor torqued. An example of such a unit is included in a device identified as Hitachi Model NR83A. The Hitachi Model NR 83A includes a piston and fastener driving element assembly in which the fastener driving element includes exterior threads without a torquing flange and meshing interengagement with the interior threads of the piston is accomplished without creating substantial opposing axial forces between the threads. A locking compound is used to set the final assembly. The arrangement does not contemplate convenient disassembly since, with the elimination of the need to torque to the assembly, the usual tool engaging flat surfaces provided for the purpose of torquing have been eliminated.

Another type of assembly involves the extension of the cylindrical end of the fastener driving element to a point beyond the threaded bore and then providing a locking nut on the extended end which serves to engage the portion of the piston surrounding the upper end of the bore. With an arrangement of this type, it is possible to eliminate the use of the locking compound if the nut is of the locking type, as, for example, a lock nut or the like. A disadvantage of the second type of connection wherein a lock nut is utilized is that the arrangement tends to extend the height of the tool and to add weight or increase the mass of the driver-piston combination.

In situations where the tolls are used extensively, a driver can show sufficient wear as to require replacement for as many as three or more times during the life of the tool. The driver is a fairly expensive part which must be hardened by heat treatment or the like. The usual practice is to replace the driver in the assembly by removing the same from the piston and reconstructing the connection with a new driver. The wear on the driver that requires replacing is wear on the lower fastener engaging surface thereof. Where this wear gets to an extent equal to one-eighth of an inch, replacement is in order. Moreover, it will be understood that variation in the length of the driver to an extent of one-eighth of an inch can result in a significant difference in the extent to which the head of the fastener is countersunk with respect to the workpiece. It is also sometimes the practice to recondition worn drivers by grinding the lower end to provide a new fastener engaging surface and to utilize shims when the reconditioned driver is reconnected with the piston. In all of the situations outlined above, it is necessary to effect an initial disconnection between the piston and the old driver and then to effect a reconnection between the piston and either a new driver or a reconditioned driver. In the case where final locking is accomplished by a locking compound rather than a locking nut, new locking compound must be applied as the reconnection takes place.

An object of the present invention is to eliminate the need to effect replacement of the driver or driver-piston combination when the driver is worn or requires readjustment to accommodate a flush head condition rather than a countersunk condition by providing a method for effectively adjusting the operating position of the fastener driving element with respect to the piston in the axial direction of the piston without the necessity of disconnecting the interengaging threads and applying new locking compound when the threaded reconnection is reestablished. In accordance with the principles of the present invention, this objective is obtained by utilizing a method comprising the steps of heating the threaded connection sufficient to soften the thermoplastic locking compound, effecting a relative turning movement between the fastener driving element and the piston while the thermoplastic locking compound is softened to an extent sufficient to bring the fastener driving element and the piston into the desired position of adjustment, and then allowing the softened thermoplastic locking compound to harden.

Another object of the present invention is the provision of a piston-to-fastener driving element connection which is particularly suited to the method of adjustment described above. This objective is obtained in accordance with the principles of the present invention by providing a connection which includes interengaging threads on the piston and the fastener driving element and a thermoplastic locking compound between the interengaging threads. The interengaging threads include an interior thread having a pitch, a pitch diameter, and an axial length defining an interior thread surface area and an exterior thread having a pitch, a pitch diameter, and an axial length defining an exterior thread surface area. The difference in the pitch diameter between the interior and exterior threads is within a range of 0.000" to 0.009" so as to define a clearance space between the interior and exterior thread surface areas to receive the thermoplastic locking compound when the threads are interengaged. The threads are interengaged in an initial position of operation wherein an initial portion of the length of the interior thread is disposed in meshing relation with an initial portion of the length of the exterior thread. The meshing relation is devoid of significant opposing axial forces acting between the threads. The interior and exterior thread surface areas within the initial portions of the lengths thereof have the thermoplastic locking compound disposed in contact therewith and filling the clearance space therebetween in a hardened condition so as to secure the piston and fastener driving element together in the initial position of operation. The piston and fastener driving element have flat surfaces provided thereon for the purpose of enabling the same to be conveniently engaged by tools for effecting a relative turning movement therebetween into different adjusted positions of operation. The piston and fastener driving element are movable from the initial position of operation in response to (1) the application of heat thereto sufficient to soften the thermoplastic locking compound and (2) a relative turning movement between the piston and the fastener driving element in either direction into any desired adjusted position of operation while the thermoplastic locking compound is in the softened condition and in one direction into a final position of operation wherein a final portion of the length of the interior thread is disposed in meshing relation with a final portion of the length of the exterior thread so as to compensate for wear of the fastener driving element while in the initial position of operation and in subsequent adjusted positions of operation. The interior and exterior threads have portions of their lengths common to both the initial portions and the final portions defining a total thread surface area contacted by the thermoplastic locking compound in any position of operation. The ratio of the total thread surface area to the operative piston area is within the range of 0.540:1 to 0.373:1 so as to insure that there is sufficient thread surface area contacted by the hardened thermoplastic locking compound within the associated clearance space to effectively secure the piston and the fastener driving element together in any position of operation.

Another object of the present invention is the provision of a piston to fastener driving element connection which is simple in construction, economical to manufacture, and effective in operation.

These and other objects of the present invention will become more apparent during the course of the following detailed description and appended claims.

The invention may best be understood with reference to the accompanying drawings wherein an illustrative embodiment is shown.

IN THE DRAWINGS

FIG. 2 is an enlarged fragmentary vertical sectional view showing the connection between the piston and the fastener driving element in an initial position of operation;

FIG. 3 is a view similar to FIG. 2 showing the piston and fastener driving element connected in a final position of operation after the method of adjusting in accordance with the principles of the present invention has been accomplished;

FIG. 4 is a schematic view illustrating various thread dimensional relationships pertinent to the present invention.

Figure 1:
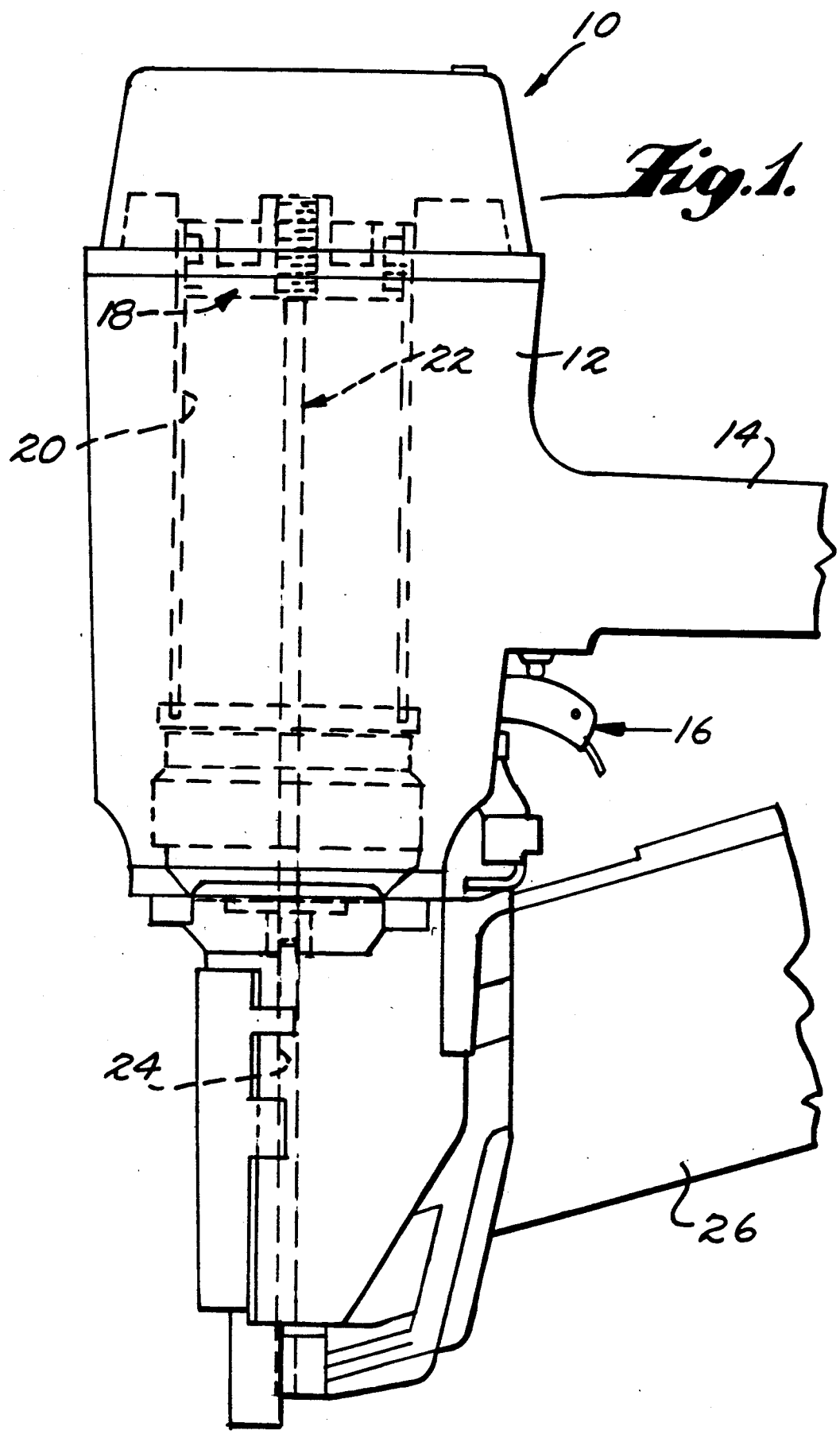
FIG. 1 is a side elevational view of a fastener driving device showing the piston and fastener driving element assembly embodying the principles of the present invention in dotted lines within the cylinder and drive track of the device.

Referring now more particularly to the drawings, there is shown in FIG. 1 a fastener driving device, generally indicated at 10. The fastener driving device 10 is illustrated merely to exemplify the type of device to which the present invention is applicable. The device 10, as shown, is of the pneumatically actuated type which includes a portable housing 12 having a hollow handle 14 defining a reservoir connectable to a source of compressed air. The device includes a trigger actuated valving mechanism, generally indicated at 16, for applying the compressed air within the reservoir onto a piston, generally indicated at 18, which is mounted for movement within a cylinder 20 through repetitive cycles of operation, each of which includes a drive stroke and a return stroke. The piston 18 is connected together with a fastener driving device or driver, generally indicated at 22, which extends from the piston 18 and is mounted for movement with the piston through a drive track 24. In the typical device 10 shown, a magazine assembly 26 is provided for feeding successive fasteners into the drive track 24 to be driven by the faster driving element 22 outwardly thereof into the workpiece during the drive stroke of the piston 18. The return stroke can be effected in any known fashion as, for example, a return plenum chamber arrangement (not shown).

It will be understood that the principles of the present invention have applicability to other types of fastener driving devices such as internal combustion acutated devices and ballistic actuated devices provided their operating temperatures are fairly low.

Referring now more particularly to FIGS. 2 and 3, the piston 18 consists essentially of a cylindrical body 28 made of aluminum alloy having annular grooves 30 formed in the exterior periphery thereof for receiving suitable O-ring seals (not shown). The cylindrical body includes a top surface 32 defining with the O-ring seals the operating pressure area of the piston. Extending through the cylindrical body along the cylindrical axis thereof is a bore on which interior threads 34 are formed. It will be noted that the central portion of the top surface 32 is defined by an annular boss 36 within which the threads 34 extend. The exterior of the boss is formed with a pair of opposed wrench engaging flat surfaces 38.

The fastener driving element 22 is preferably made from bar stock steel which may be suitably heat treated.

As shown, the bar stock steel is formed to include a cylindrical end portion 40 formed with exterior threads 42. It will be noted that the cylindrical end portion 40 of the fastener driving element 22 constitutes the largest transverse dimension of the fastener driving element and that just below the cylindrical end portion 40 the fastener driving element is formed in two opposed wrench engaging flat surfaces 44.

The piston 18 and fastener driving element 22 are connected together by effecting a relative turning motion between the two as placing one of the two pairs of flat surfaces 38 and 44 in a vise and applying a wrench or other suitable tool to the other.

Prior to the interengagement of the threads, they are suitably cleaned in accordance with conventional practice and then have applied to each an amount of thermoplastic locking compound in accordance with known practices. Any suitable thermoplastic locking compound may be utilized. An exemplary embodiment is Loctite Grade 271, manufactured by Loctite Corporation. The compound is applied to both the interior and exterior threads and a bead of compound can be observed being pushed ahead of the fastener driving element 22 as the fastener driving element 22 is screwed into the piston 18. As best shown in FIG. 2, the exterior threads 42 are interengaged within the interior threads 34 so that each includes a portion of its length in a meshing relation which is generally equal to the total length of the threads provided.

The thermoplastic locking compound engages the entire thread surface area of the interior and exterior threads and fills the space between the thread surface areas. In accordance with the principles of the present invention, applicants have found that, when sufficient thread surface area has been provided and the clearance space therebetween is within certain limits the resultant connection can be adjusted by undertaking the steps of heating the connection to a temperature sufficient to soften the thermoplastic locking compound as, for example, to a temperature of approximately 350° when using the preferred compound noted above, effecting a relative turning movement between the piston 18 and the fastener driving element 22 utilizing flats 38 and 44 while the thermoplastic locking compound is in a softened condition to an extent sufficient to establish a desired position of adjusted operation. Finally, the thermoplastic locking compound is allowed to harden.

The extent of the turning action will be dependent upon the purpose for which the adjustment is made. In some instances, the purpose of the adjustment is to extend the fastener driving element into the piston so that the fasteners being driven will be driven flush rather than countersunk. An adjustment into this position would require a turning movement of the fastener driving element within the piston in a counterclockwise direction as viewed from the top. A more typical purpose for effecting movement of the piston and fastener driving element into an adjusted position of operation is that the device has been used with the piston driver assembly in its initial operating position for a period of operation the duration of which is sufficient to reduce the extended dimension of the fastener driving element. A wear extent of one-eighth of an inch is a typical amount which would necessitate readjustment, although one-sixteenth of an inch may be enough in some instances depending upon the particular use. To effect an adjustment for this purpose, a clockwise turning movement of the fastener driving element with respect to the bore is made while the thermoplastic locking compound is in a softened condition. As many as three or more such adjustments can be made in accordance with the principles of the present invention. At the end of the adjustment range provided, the piston 18 and fastener driving element 22 assume a final position of operation, such as shown in FIG. 3. In this position, it will be noted that the portions of the lengths of the threads which are in intermeshing relation are less than the portions of the lengths of the threads which are in meshing relation in the initial portion of operation shown in FIG. 2. It will be noted that the initial portions of the lengths of the threads which are in meshing relation have portions which are common to the final portions of the length of the threads and these common portions are equal to the final portions.

The effectiveness of the thermoplastic locking compound to secure the piston and fastener driving element together is a function of the amount of thread surface area contacted by the thermoplastic locking compound and the thickness of the compound extending between the thread surface areas contacted. The thickness of the compound between the thread surface areas is a direct function of the clearance space which, in turn, is a direct function of the difference between the pitch diameter of the interior threads 34 and the pitch diameter of the exterior threads 42.

In accordance with the principles of the present invention, this pitch diameter difference should be within an operative range of between 0.000" to 0.013". It is preferably within a range of 0.000" to 0.009". This difference in the pitch diameters of the threads is also a direct function of the class fit between the threads. A preferred exemplary embodiment is to utilize an American standard unified class 3B thread for the interior threads 34 or an equivalent thereof in another profile and to utilize an American standard unified class 3A thread for the exterior threads 42 or an equivalent thereof in another profile.

With respect to the amount of thread surface area which must be provided, this will depend to a large extent upon the power level of the particular piston-driver assembly. This power level is a function of the operative surface area of the piston. Moreover, not all of the thread surface area provided enters into the effectiveness of the connection. Indeed, it is only the common portions which are in meshing relation in any position of operation. In addition to the effective length of thread, the thread surface area is also a function of the thread pitch and the pitch diameter. A preferred pitch in the exemplary embodiment previously given is a UNF or fine pitch thread, although a UNEF or extra fine pitch thread may be utilized or a UNC or coarse pitch thread may also be utilized if desired. An expression of the required thread surface area which takes into account the variation for power size and variation in thread lengths in meshing relation is the ratio of the total thread surface area provided by the common lengths of both the interior threads 34 and the exterior threads 42 such as shown in FIG. 3 to the operative piston area provided by the top surface 32. This ratio is operative within a range of 0.700:1 to 0.373:1 and preferably within a range of 0.540:1 to 0.373:1. With the preferred embodiment shown, the ratio is 0.373:1.

For practical purposes, it is preferable to keep the pitch diameter of the exterior threads 42 relatively small so that the bar stock which is used to form the fastener driving element 22 can be relatively small. A preferred pitch diameter to length relationship with respect to the portions of the lengths of threads in meshing relation in the initial position of operation is a ratio of initial meshing thread length to pitch diameter of at least 2.2 to 1.

Figure 5:
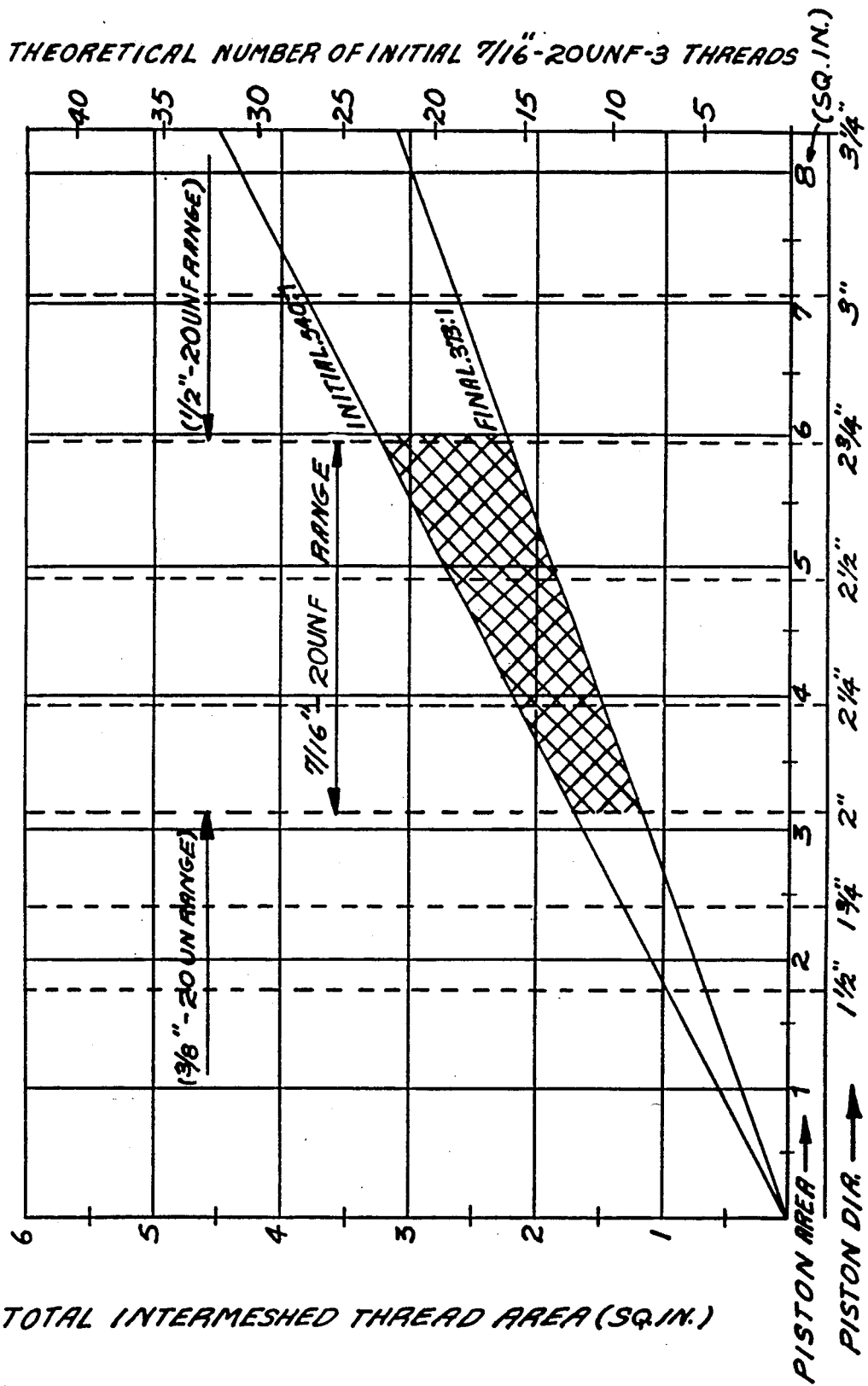
FIG. 5 is a graph illustrating a range of dimensional characteristics utilized in accordance with the principles of the present invention.

FIG. 5 graphically illustrates the relationship between piston size and total intermeshed thread area. The factors which enter into the total intermeshed thread area are schematically illustrated in FIG. 4. These include the perpendicular distance between opposed thread surfaces (GAP) and the functional length of one side of opposed intermeshed threads (FL). These factors are in turn a function of the external major thread radius (r) and the internal minor thread radius ($r_1$). In FIG. 4, r is shown as being equal to the external major diameter plus 0.125 pitch diameter clearance divided by 2. The radius $r_1$ is equal to the internal minor diameter minus 0.125 pitch diameter clearance divided by 2. FL and GAP are expressed as follows:

$$FL = \frac{.5 \text{ (major dia.} - \text{minor dia.} + .125 \text{ pitch dia. clearance)}}{\cosine 30°}$$

$$GAP = .25 \text{ pitch diameter clearance}$$

With reference to the graph of FIG. 5:

$$A \text{ total} = 4n\pi(1.1547 \ r^2 - 1.1547 \ r_1 r + r_1 FL)$$

which simplified gives:

$$A \text{ total} = n(14.51 \ r^2 - 14.51 \ r_1 r + 12.566 \ r_1 FL)$$

in which the total number of intermeshing thread surfaces is four, n is the total number of intermeshing threads and the reciprocal of cosine 30° is 1.1547.

The graph of FIG. 5 relates to a preferred embodiment and shows the initial number of intermeshed 7/16-20 threads when the ratio of total intermeshed thread area to piston area is 0.540:1. Included in the graph are three thread sizes, located at the logical places to change size. The preferred 7/16-20 size is for pistons from 2" to 2¾" diameter which is exemplary of most tools of a full line. For convenience of field servicing of a full line of tools, a "20" pitch would be used for pistons below 2" diameter and above 2¾" diameter.

It thus will be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. A method of adjusting the operating position of a fastener driving element of an assembled fastener driving device with respect to a piston of said device in the axial direction of the piston wherein connection between the fastener driving element and piston constitutes interengaged threads and a thermoplastic locking compound coating interengaging thread surfaces and filling spaces therebetween, said adjusting being effected without the necessity of disconnecting the interengaged threads and of applying new locking compound when a threaded reconnection is reestablished, said method comprising the steps of heating the threaded connection sufficient to soften the thermoplastic locking compound, effecting a relative turning movement between said fastener driving element and said piston while said thermoplastic locking compound is softened to an extent sufficient to bring said fastener driving element and said piston into the desired position of adjustment such that the interengagement of the threads is devoid of significant opposing axial forces acting between the threads, and allowing the softened thermoplastic locking compound to harden.

2. A method as defined in claim 1, wherein said heating step raises the temperature of said thermoplastic locking compound to approximately 350° F.

* * * * *

UNITED STATES PATENT AND TRADEMARK OFFICE
CERTIFICATE OF CORRECTION

PATENT NO. : 5,091,123

DATED : February 25, 1992

INVENTOR(S) : William S. FEALEY

It is certified that error appears in the above-identified patent and that said Letters Patent is hereby corrected as shown below:

Column 2, line 18, cancel "tolls" and insert therefor --tools--.

Signed and Sealed this

Twenty-second Day of June, 1993

Attest:

MICHAEL K. KIRK

*Attesting Officer*  *Acting Commissioner of Patents and Trademarks*